Figure 1:
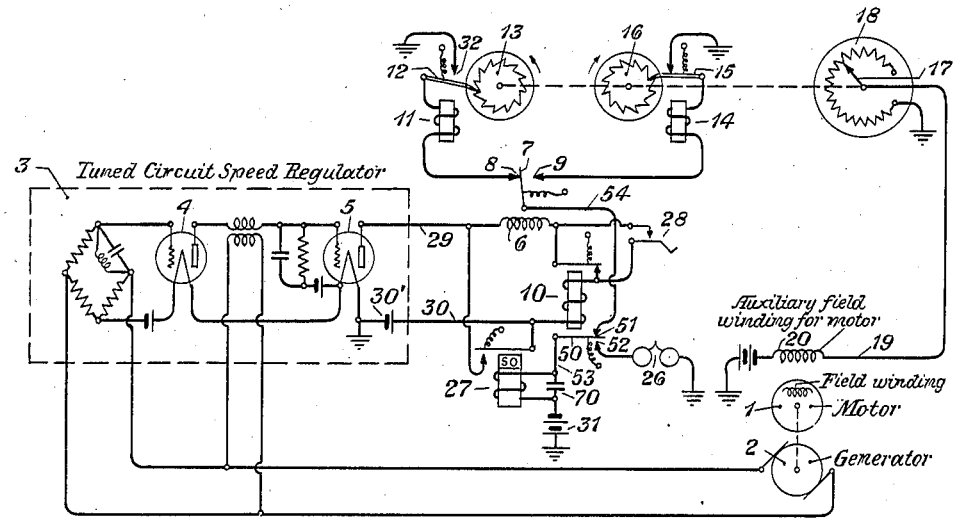

July 7, 1936.  A. L. MATTE  2,046,422

MOTOR GENERATOR REGULATOR SYSTEM

Original Filed May 25, 1932

INVENTOR
A. L. Matte
BY
ATTORNEY

Patented July 7, 1936

2,046,422

UNITED STATES PATENT OFFICE 2,046,422

MOTOR GENERATOR REGULATOR SYSTEM

Andrew Lewis Matte, Summit, N. J., assignor to American Telephone and Telegraph Company, a corporation of New York Original application May 25, 1932, Serial No. 613,500. Divided and this application March 10, 1936, Serial No. 68,099

4 Claims. (Cl. 171—119)

This invention relates to an improved type of regulator system for controlling the characteristics of a dynamoelectric device, such for example, as a motor generator, and more particularly to means for preventing a substantial variation in the operation of such a device upon failure of operation of a portion of the regulator system. This application is a division of my copending application Serial No. 613,500, filed May 25, 1932.

The arrangements of the invention are particularly applicable in connection with multi-frequency generators utilized to supply the various carrier frequencies used in voice frequency carrier telegraph systems. It has been the practice in systems of this type to control the output characteristics of the generator by means of a tuned circuit speed regulator which operates in such a manner as to cause changes in current through an auxiliary field winding of the driving motor, thus changing its speed and hence the generator frequency.

The tuned circuit speed regulator device utilized in illustrating the principles of the invention consists of a circuit comprising a plurality of vacuum tubes, the output of one of which supplies current directly to the auxiliary field winding of the motor. The burning out of a tube or the loss of plate or filament batteries in this device would reduce the current to zero in the auxiliary field winding and might cause the motor speed to increase by several hundred R. P. M. For example, each tuned circuit regulator might contain four tubes and a ballast lamp and two such devices might be involved in two-way operation over a given telegraph channel. The failure of any of these eight tubes, ballast lamps, or battery supply circuits would disable all working telegraph circuits whose current supply is controlled thereby. This might involve as many as 240 carrier channels. Accordingly, the primary object of the arrangements of the invention consists in providing regulating means for the generator output of such a character that a failure of the regulator will not cause substantial variation in the operation of the generator. Other objects and features of the arrangements of the invention will appear more fully from the detailed description thereof hereinafter given. Other types of regulators than those utilizing vacuum tubes might be utilized in the arrangements of the invention.

It will appear that the disadvantages of the regulator systems of the prior art consist in the following conditions: First, the current for the auxiliary field winding of the motor is dependent upon the actual functioning of the regulator; second, violent changes in the operation of the regulating mechanism, such as might be produced by accidental causes, result in correspondingly violent changes in speed. In the arrangements of the invention the above two conditions are taken care of in that the vacuum tube speed regulator circuit is utilized to adjust a rheostat which controls the current in the auxiliary field winding of the motor; the setting of this rheostat remaining unaltered either upon complete failure of the regulator, such as might ensue from the burning out of a tube, or upon large and sudden changes in the regulator output. In a modification of the arrangements of the invention the above mentioned two conditions may also be taken care of. The general principle of the modified form of the arrangements of the invention is to leave the regulator of the prior art in which current therefrom flows directly through the auxiliary field winding unchanged, and to add an auxiliary control circuit in which corresponding changes in current take place whenever they occur in the auxiliary field winding. Upon a failure of the vacuum tube circuit a quick change is made from the normal control circuit to the auxiliary control circuit which includes a preadjusted rheostat.

While for purposes of illustration the invention will be described with reference to the above-mentioned combination of a vacuum tube speed regulator and a motor generator associated therewith, it will be evident that the nature of the regulating mechanism and the character of the regulation desired are not involved, nor is the nature of the regulated apparatus of consequence provided it is a dynamo-electric machine whose desired characteristic is subject to regulation by means of a current through an auxiliary field.

Figure 2:
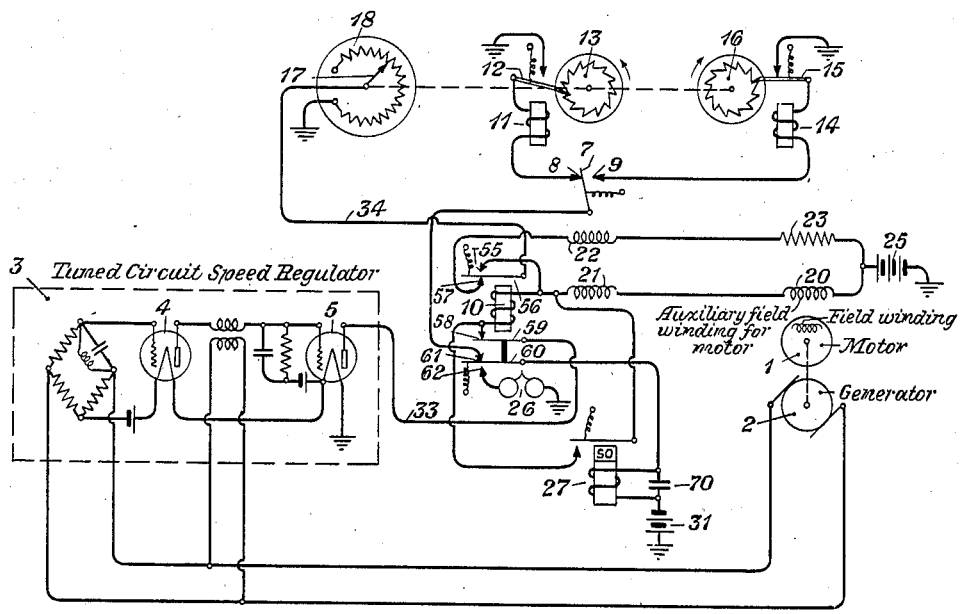

The invention may be more fully understood from the following description, together with the accompanying drawing, in the Figures 1 and 2 of which the invention is illustrated. Fig. 1 is a circuit diagram embodying one form of the invention. Fig. 2 is a circuit diagram showing the invention in modified form. Similar reference characters have been utilized to denote like parts in both of the figures.

In Fig. 1 is shown a motor 1 which drives the generator 2. This motor would be provided with the usual field winding. An auxiliary field winding 20 for controlling the speed of the motor is shown included in a circuit 19 which is completed over the brush 17 and the resistance of an adjustable rheostat 18. The brush of the rheostat 18 is mounted on a common shaft with the ratchet wheels 13 and 16, which may be driven, respectively, counter-clockwise or clockwise by the up and down operation of the ratchet arms 12 and 15. These arms are actuated in this manner by the magnets 11 and 14 in combination with suitable restoring springs. The above mechanism functions to cut resistance in or out of the circuit 19 of the auxiliary field winding 20 of the motor 1, according to whether magnet 14 or 11 is actuated. The output of the generator 2 is connected to a tuned circuit speed regulator 3 shown in simplified form enclosed in dotted lines. This tuned circuit speed regulator is well known in the art and may include a plurality of vacuum tubes, such as tubes 4 and 5. The output of tube 5 is completed as follows: from the plate of tube 5, conductor 29, winding 6 of a galvanometer relay, armature and contact of relay 10, winding of relay 10, conductor 30, through battery 30' to filament of tube 5. The output current from the tuned circuit speed regulator is, therefore, impressed upon the winding 6 of the galvanometer and the winding of the relay 10. The galvanometer is so adjusted that when the motor speed is correct, and when the output of the regulator is at the proper level, the armature 7 of the galvanometer, which may be spring-biased, lies between the contacts 8 and 9. Under such conditions the magnets 11 and 14 will not be actuated. When, as a result of a change in motor speed, the current from the output of the speed regulator increases, the armature 7 establishes contact with contact 8. This will close the following circuit: from battery 31, winding of relay 27, conductor 53, armature 50 and contact 51 of relay 10, conductor 54, armature 7, contact 8, winding of magnet 11, ratchet arm 12, contact 32 to ground. This will operate the magnet 11 and will rotate the ratchet wheel 13. This will operate the brush 17 to reduce the resistance of the rheostat 18 included in the circuit 19 with the auxiliary field winding 20 of the motor 1. This will reduce the speed of the motor and of the generator. Conversely, if the current in the output circuit of the tuned speed regulator is reduced, the armature 7 will close the contact 9. This will operate the magnet 14 and cause the ratchet wheel 16 to rotate in a clockwise direction. This, in turn, will operate the brush 17 to increase the resistance provided by the rheostat 18 in the circuit of the auxiliary field winding 20. This will tend to increase the speed of the motor and the generator.

If the output from the tuned circuit speed regulator should fail completely for any reason, such as the failure of one of the tubes, the relay 10 would become deenergized and would remain deenergized until the switch 28 was operated and the output current of the tuned circuit speed regulator restored. The deenergization of relay 10 will open at its lower contact and armature the circuit previously traced from the battery 31 for the magnets 11 and 14. This will leave the rheostat 18 on its last legitimate setting. The deenergization of relay 10 will also operate an alarm 26.

If the output current from the tuned circuit speed regulator does not completely cease but changes sharply up or down so as to require the repeated operation of either 11 or 14, the slow-operating relay 27 will operate. This will short-circuit the output circuit of the tube 5 and bring about the same condition as would result from a complete failure of the tuned circuit speed regulator in the manner heretofore described.

In Fig. 2 is shown a modification of the arrangements of Fig. 1. The motor generator is connected to the tuned circuit speed regulator 3 as previously described. To control the current flowing through the auxiliary field winding 20 of the motor 1, two independent circuits are provided. The first circuit is as follows: from the plate of the tube 5, over conductor 33, armature 59 and contact 58 of relay 10, winding of relay 10, winding 21 of a galvanometer relay, through the auxiliary field winding 20 of the motor, to the battery 25 and ground. The battery 25 furnishes operating current for the plate circuit of tube 5. The second circuit is completed as follows: from the resistance of the adjustable rheostat 18, brush 17, conductor 34, armature 56 and contact 57 of relay 10, winding 22 of the galvanometer relay, through the resistance 23, to battery 25 and ground. The armature 17 of the adjustable rheostat is rotated mechanically by the driving ratchet wheels 13 and 16 in the manner heretofore described. The resistance 23 simulates in electrical characteristics the auxiliary field winding 20. As heretofore pointed out in the two independent circuits previously traced are included, respectively, the windings 21 and 22 of a differentially wound spring-controlled galvanometer relay. The currents through resistance 23 and auxiliary field winding 20 pass through the differentially arranged windings 22 and 21 in such a manner that when the operation of the speed regulator is normal the currents through these windings are equal and opposite in effect and the armature 7 will stand between the contacts 8 and 9. Any change in the current through the auxiliary field winding 20 due to the operation of the speed regulator will cause the armature 7 to make contact either with contact 8 or contact 9, which in the manner heretofore described, will operate the ratchet wheels 13 and 16 and cause the rheostat 18 to operate to change the current through the resistance 23 until it is again essentially equal to the current in the auxiliary field winding 20 and opposite in effect thereto due to the differential arrangement of said windings. When this occurs, the armature 7 will come to rest again between the two contacts 8 and 9. In this manner an auxiliary circuit is provided which always has going through it a current of the same value as the current which flows through the auxiliary field winding 20 and is required at that moment to maintain the generator at its correct speed.

In the event of failure of current from the tuned circuit speed regulator, the relay 10 will become deenergized. The armature 56 and contact 55 of relay 10 immediately transfer the circuit including the auxiliary field winding 20 to the conductor 34 and the adjustable rheostat 18. At the same time the middle armature disconnects winding 20 from regulator 3. The armature 60 of relay 10 opens the circuit from the battery 31, over the armature 7 to the magnets 11 and 14. This will stop any operation of the ratchet wheels 13 and 16 and will bring the arm of the rheostat to a standstill. Simultaneously, the alarm 26 will be operated over armature 60 and contact 62 of relay 10. The motor generator then continues to run at the speed determined by the last setting of the adjustable rheostat 18. If the current from the tuned circuit speed regulator does not completely cease but changes sharply up or down so as to cause either magnet 11 or magnet 14 to operate repeatedly in quick succession, the slow-operating relay 27 will operate due to the condenser short-circuiting it and short-circuit the winding of relay 10 and cause it to release. This will initiate the same train of operation as ensues upon a complete failure of the tube of the tuned circuit speed regulator. To restore operation when 3 has been fixed, armatures of 10 may be restored by hand or by a device like 28 in Fig. 1.

While the invention has been disclosed as embodied in certain specific forms which are deemed desirable, it is to be understood that it is capable of embodiment in other and widely varied forms without departing from the spirit of the invention as disclosed in the appended claims.

What is claimed is:

1. A motor generator control system comprising a motor and generator operated thereby, a vacuum tube regulator connected to the output of said generator, an auxiliary field winding for said motor, a first circuit for connecting said auxiliary field winding to the output of said vacuum tube regulator, a second circuit in which the current flow is adapted to simultaneously simulate the current flow in said first circuit, and means responsive to a cessation of current flow in said first circuit for connecting said auxiliary field winding in said second circuit.

2. A motor generator control system comprising a motor and generator operated thereby, a vacuum tube regulator connected to the output of said generator, an auxiliary field winding for said motor, a first circuit for connecting said auxiliary field winding to the output of said vacuum tube regulator, a second circuit including a current regulating device, a galvanometer controlled by the current flow in said first and second circuits, switching means controlled by said galvanometer for operating said current regulating device, and means in said first circuit operative upon a failure of current flow therein for connecting said auxiliary field winding to said second circuit.

3. A motor generator control system comprising a motor and generator operated thereby, a vacuum tube regulator connected to the output of said generator, an auxiliary field winding for said motor, a first circuit for connecting said auxiliary field winding to the output of said vacuum tube regulator, a second circuit including a current regulating device, a galvanometer controlled by the current flow in said first and second circuits, switching means controlled by said galvanometer for operating said current regulating device, a relay, means for completing said first circuit through the winding and over a contact of said relay when operated, and means operative upon the release of said relay for connecting said auxiliary field winding to said second circuit.

4. A motor generator control system comprising a motor and generator operated thereby, a vacuum tube regulator connected to the output of said generator, an auxiliary field winding for said motor, a first circuit for connecting said auxiliary field winding to the output of said vacuum tube regulator, a second circuit including a current regulating device, a galvanometer controlled by the current flow in said first and second circuits, switching means controlled by said galvanometer for operating said current regulating device, a relay, means for completing said first circuit through the winding and over the contact of said relay when operated, means operative upon the release of said relay for connecting said auxiliary field winding to said second circuit, and a second relay responsive to sudden variations in current in said first circuit for de-energizing said first mentioned relay.

ANDREW LEWIS MATTE.